United States Patent [19]
Mazzini

[11] Patent Number: 5,383,631
[45] Date of Patent: Jan. 24, 1995

[54] TRIAXIALLY STABILIZED SATELLITE PROVIDED WITH ELECTRIC PROPULSORS FOR ORBITAL MANEUVERING AND ATTITUDE CONTROL

[75] Inventor: Leonardo Mazzini, Rome, Italy

[73] Assignee: Alenia Spazio S.p.A., L'Aquila, Italy

[21] Appl. No.: 824,860

[22] Filed: Jan. 23, 1992

[30] Foreign Application Priority Data

Jan. 23, 1991 [IT] Italy .................. RM91 A000051

[51] Int. Cl.⁶ ............................................. B64G 1/26
[52] U.S. Cl. .................. 244/169; 244/164
[58] Field of Search ........... 244/164, 169, 172, 158 R, 244/52, 3.22

[56] References Cited

U.S. PATENT DOCUMENTS

| | | | |
|---|---|---|---|
| 3,304,717 | 2/1967 | Gutton et al. | 60/202 |
| 3,937,423 | 2/1976 | Johansen | 244/169 |
| 3,977,633 | 8/1976 | Keigler et al. | 244/169 |
| 3,984,071 | 10/1976 | Fleming | 244/169 |
| 5,020,746 | 6/1991 | Anzel | 244/169 |

FOREIGN PATENT DOCUMENTS

| | | | |
|---|---|---|---|
| 878336 | 8/1971 | Canada | 244/169 |
| 2128999 | 5/1990 | Japan | 244/169 |

OTHER PUBLICATIONS

Frank E. Marble and J. Surugue (Eds) 'Physics and Technology of Ion Motors' 1966, Pub. New York (USA) Gordon and Breach Science Publishers, New York (USA).

AIAA 20th International Electric Propulson Conference, Oct. 1988; T. Duhamel et al. 'Design and Integration of an Electric Propulsion System on the Eurostar Spacecraft'.

Luftfahrttechnik, Raumfahrttechnik, vol. 9, No. 1, Jan. 1963, Dusseldorf, Germany Gunther F.:'Raumfahrtaufgaben fur Elecktrische und Nuklear-Elektrische Antriebsanlagen'.

Primary Examiner—Michael S. Huppert
Assistant Examiner—Anne E. Bidwell
Attorney, Agent, or Firm—Herbert Dubno

[57] ABSTRACT

A triaxially stabilized satellite having a Cartesian axis system with mutually perpendicular X, Y and Z axes, two electric propulsors for orbital maneuvers and attitude control of the satellite and having respective versors including a right angle between them and lying in an X-Y plane, the versors being orientable in the plane about the Z axis to include a variable angle a with the X axis to impart two degrees of freedom of movement to the electric propulsors, the electric propulsors generating thrust vectors in line with the versors away from a center of gravity of the satellite at an intersection of the versors, the electric propulsors being firable independently and for respective angles of arc in their displacement with the degrees of freedom to maneuver the satellite orbitally, control attitude of the satellite and dissipate angular momentum of the satellite. The electric, preferably ionic, pulsars can be used with triaxially stabilized satellites with an LEO or GEO.

1 Claim, 1 Drawing Sheet

TRIAXIALLY STABILIZED SATELLITE PROVIDED WITH ELECTRIC PROPULSORS FOR ORBITAL MANEUVERING AND ATTITUDE CONTROL

FIELD OF THE INVENTION

The present invention relates to a satellite which relies on a limited number of propulsors in order to effect all maneuvers which are required for the orbital movements of the satellite, the control of its attitude in electrical propulsion stages and the dumping of momentum absorbed by the satellite.

BACKGROUND OF THE INVENTION

The use of electric propulsors for the orbital control of an artificial, geostationary satellite, outside the plane of the orbit Is known to the state of the art.

When compared to the traditional systems based on the use of chemical propulsors, the use of electric propulsors reduces the weight of the propellant which has to be loaded on the satellite, particularly for long-term missions in orbit, of the order of ten years or longer.

Until now the use of electric propulsion for the orbital control of the satellite in the plane of the orbit has not yet been proposed.

By means of propulsors of another kind than electric, particularly by means of chemical propulsors, the following operations are performed: maneuvers of orbital control of the satellite within the plane of the orbit; maneuvers for maintaining in the satellite on station in the East-West direction, with respect to a nominal point or set-point position of the station, or changes in the altitude of the satellite.

Therefore, for instance, a geosynchronous satellite which has no special requirements for frequent station changes, having a mass ranging between 1 and 1.3 metric tons in operative life, with a work life of the order of 10-15 years, has to load between 25 and 35 kg of additional chemical propellant only for these functions.

SUMMARY OF THE INVENTION

The invention is a traxially stabilized satellite characterized by the fact that it is provided with a system of electric propulsors for orbital maneuvers and attitude control, the system consisting essentially of two propulsors mounted on orientatable flanges whose trust vectors F are found on the plane x, y of the satellite.

With the present invention it is possible to insure, in addition to all the classical functions related to orbital orientation, also the use of the propulsor either for elimination of inertia of the satellite, or the angular control of the same.

All this, besides leading to propellant savings which depend on the magnitude of the surrounding external torques, also makes possible the complete replacement of the auxiliary propulsion system on a space satellite with a system of electric propulsors mounted on flanges provided with two degrees of rotational freedom with respect to the rigid central body.

The configuration of the satellite which is the object of the present invention, represents the embodiment preferred by the inventor. The configuration can be achieved by arranging at will the subsequently described elements, provided that the described number of propulsors, here two, can be higher or lower and can accomplish the totality of functions described to be performed by the same.

BRIEF DESCRIPTION OF THE DRAWING

The above and other objects, features and advantages will become more readily apparent from the following description, reference being made to the accompanying drawing in which.

Further, by always making reference to the enclosed drawing, the operation of the satellite constituting the object of the invention, for which the grant of a patent is requested, is being described.

Figure 1A:
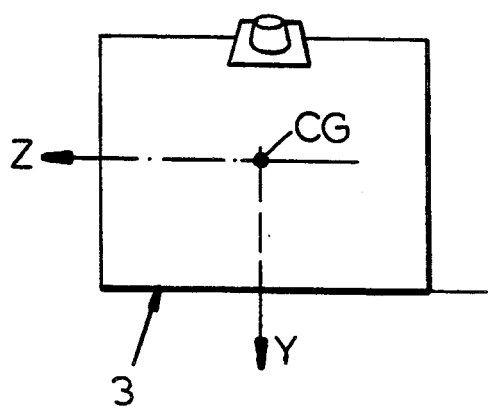
FIGS. 1a and 1b are elevational views taken in mutually perpendicular directions showing the electrical pulsars and their orientation with respect tot he center of gravity of a satellite with Cartesian reference axes.
Figure 1B:
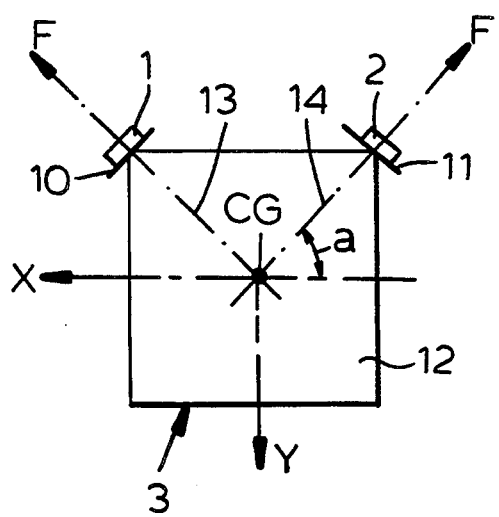

FIGS. 1a and 1b represent schematically, as already mentioned, a generic triaxially stabilized satellite.

FIGS. 1a and 1b show the Z-Y plane and the X-Y plane, respectively, of two electrical pulsars 10, 11 whose versors 13, 14 form a right angle with one another where they intersect at the center of gravity the CG of the satellite, in the X-Y plane 12 which is rotatable about the Z axis so that the versors 13, 14 can define the angle a with the X axis.

The reference system, represented by three mutually orthogonal cartesian axes, is defined by the axis Z positive with respect to the Earth, the axis Y perpendicular to the orbit towards South and the axis X orthogonal with respect to Z and Y. The satellite is conceived as firmly defined in this set of axes, except for negligible attitude errors.

Therefore we define:

F1=(F1x, F1y, F1z): tridimensional vector expressing the generated force of propulsor 1;

F2=(F2x, F2y, F2z): tridimensional vector expressing the generated force of propulsor 2.

The propulsors are mounted on an orientatable flange, so as to generate through a nominal orientation of the same the following force components:

Propulsor 1 F1x=F*cos(a); F1y=F*sin(a); F1z=0;
Propulsor 2 F2x=−F*cos(a); F2y=F*sin (a); F2z=0;

wherein "a" which will be called "elevation angle" can be selected between 0 and 90 degrees and has to be selected based on the mission requirements and on the base of configuration restrictions. In the case of a=0 it will not be possible to execute maneuvers outside of the plane and there will be maximum efficiency in executing maneuvers within the plane, while in the case of a=90 degrees the opposite takes place. In the case a=45 degrees both types of maneuvers can be executed with the same efficiency. In order to have the possibility to fire the propulsors independently it is necessary that the thrust axis of each of them passes through the center of gravity in order to avoid the accumulation of the moment of momentum. The thrust F (Nm) is a free variable of the design which will be selected based on the power available on board and the time spans assigned for the maneuvers: the typical values in the interval vary from a N to 1N.

Further, first the use of the propulsors for orbital transfer and then their use for attitude control will be described.

The configuration of the described propulsors makes it possible to carry out all types of orbital transfers between two generic orbits, and now in a simplified but non-limitative manner the strategy involved in the case of a transfer between quasi circular and neighboring orbits will be described. For the case of orbits which are not close to each other (for which the linearization of the equation makes no sense) a sequence of infinitesimal transfers has to be imagined, each of these transfers to be carried out according to the strategy which will be described. Should the orbits be strongly eccentric, there would not be any conceptual difference. No generality will be lost by considering that the plane of the final orbit coincides with that of the equator, and this way, considering:

a: major semi-axis;
e: eccentricity;
i: inclination;
o: argument of the perigee;
O: straight ascension of the ascendent node;
M: average irregularity;
h=e*sin(o);
K=e*cos(o);
p=tg(i)*sin(o);
q=tg(i)*cos(o);

the transfer of the orbit will coincide with the transfer:
a=aO→d=af;
h=hO→h=hf;
K=KO→K=Kf;
p=pO→p=O;
q=qO→q=O.

Supposing that hO, hf, KO, Kf, aO and af are small enough to allow writing of the following linearized equations:
da=(2/nO)*dVx;
dh=(2/nO*aO*sin(1) dVx;
dk=(2/nO*aO)*cos(1) dVx;
dp=−(1/nO*oO)*sin(1) dVy;
dq=−(1/nO*aO)*cos(1) dVy;
wherein
1=nO*t
nO: pulsation of initial orbit;
t: time measured starting from the last passage of the meridian of the Aries constellation;
"d" being the symbol of the differential, "dVx" and "dVy" are the velocity variations in the directions x and y respectively.

Further there are described four maneuvers in order to carry out the following transfers: pO and qO, af→ao; hf→ho; Kf→KO.

1) Transfer of pO and qO.

Figure 2:
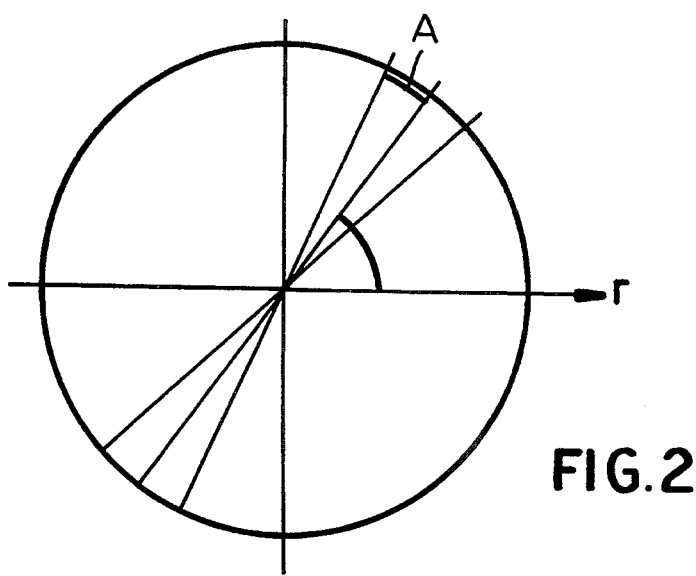
FIG. 2 is a diagram which illustrates the transfer maneuvers outside the plane.

Firing for a definite arc from B−A to B+A one obtains (FIG. 2):
pO=(2*Fy/(nO*nO*aO*M))*sin(B)*sin(A);
qO=(2*Fy/(nO*nO*aO*M))*cos(B)*sin(A);
tg(B)=pO/qO;

from these relations A and B are obtained, M, Fy, pO and qO being known. M is the mass of the satellite. If both propulsors are fired together Fy+Fly+F-2y=2*F*sin(a) results.

If the available electric power is not sufficient, it is possible to fire one propulsor at one orbit and the other at the successive ones, so as to cancel the disturbances in the plane of the orbit.

2) Transfer of af−aO.

Figure 3:
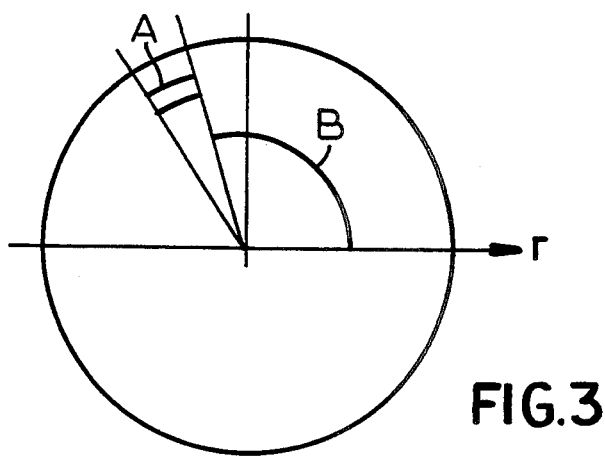
FIG. 3 is a diagram which illustrates the transfer maneuvers within the plane.

Firing along two equal arcs dephased by 180 degrees we will have (FIG. 3):
sf−aO=(8*Fx*A)/(nO*nO). All other orbital parameters will remain undisturbed;
Fx=F2x if af>aO;
Fx=F1x if af>aO.

3) Transfer of hf→hO.

In order to correct h for a finalized maneuver one obtains: hf−hO+(8*sin(A)/(nO*nO*aO))*(F*cos-(a)/M), firing the propulsor 1 from 90°−A to 90°+A and the propulsor 2 from 270°−A to 270°+A, if hf>hO. If, on the contrary, hO>hf, the firing arcs are exchanged between the two propulsors.

4) Transfer of Kf→KO.

For a correction of K the operation is the same as in the maneuver 3), rotating the firing arcs by 90 degrees.

Such propulsors can generate torque in all directions when they are each mounted on a flange 10,11 whose normal versor 13,14 points nominally towards the center of gravity (CG, FIGS. 1a and 1b) and when such normal versor is orientatable. If one flange is rotated, the force of the propulsor will generate a couple whose arm will be located (approximation valid for small angles) in the plane 12 perpendicular with respect to the axis CG-propulsor and passing through the same CG; the generated moment vector (M) will be perpendicular to this arm and to the direction CG-propulsor and therefore will be within the plane 12.

When the flange is rotated according to its two degrees of freedom, moments can be generated in all directions and sides pertaining to plane 12 and in all forms allowed by the rotating mechanism of the flanges (the allowed cone of rotation should have semi-openings g=5 degrees).

In case two propulsors are available, the torque generated by them will be summed and then the planes (p) of the two will not coincide and possibly will generate torque in any direction, firing simultaneously or alternately with suitable frequency, the propulsors rotating the mounting plate suitably. This capability to generate torque can be used either for controlling the attitude during the same propulsion, or for desaturation of the moment of the inertia accumulated previously.

I claim:

1. A triaxially stabilized satellite having a Cartesian axis system with mutually perpendicular X, Y and Z axes, two electric propulsors for orbital maneuvers and attitude control of said satellite and having respective versors including a right angle between them and lying in an X-Y plane, the versors being orientable in said plane about the Z axis to include a variable angle a with said X axis to impart two degrees of freedom of movement to said electric propulsors, said electric propulsors generating thrust vectors in line with said versors away from a center of gravity of the satellite at an intersection of said versors, said electric propulsors being firable independently and for respective angles of arc in their displacement with said degrees of freedom to maneuver said satellite orbitally, control attitude of said satellite and dissipate angular momentum of the satellite.

* * * * *